United States Patent
Ishida

(10) Patent No.: US 7,168,015 B2
(45) Date of Patent: Jan. 23, 2007

(54) TF-DETERMINATION APPARATUS, AND TF-DETERMINATION METHOD AS WELL AS PROGRAM TO BE EXECUTED FOR IMPLEMENTING THE TF-DETERMINATION METHOD

(75) Inventor: Kazuhiro Ishida, Tokyo (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 10/653,358

(22) Filed: Aug. 28, 2003

(65) Prior Publication Data
US 2004/0123209 A1 Jun. 24, 2004

(30) Foreign Application Priority Data
Aug. 28, 2002 (JP) ............... 2002-247914

(51) Int. Cl.
H04B 17/00 (2006.01)
H04J 3/14 (2006.01)
H04J 3/22 (2006.01)
H04L 1/24 (2006.01)

(52) U.S. Cl. ..................................... 714/712
(58) Field of Classification Search .................. 714/712
See application file for complete search history.

(56) References Cited

U.S. PATENT DOCUMENTS

2003/0091003 A1* 5/2003 Wang et al. ................. 370/252

FOREIGN PATENT DOCUMENTS

| EP | 1 335 506 | 8/2003 |
|---|---|---|
| JP | 2001-127724 | 5/2001 |
| JP | 2001-217895 | 8/2001 |
| JP | 2001-230683 | 8/2001 |
| JP | 2001-333123 | 11/2001 |
| JP | 2001-339325 | 12/2001 |
| JP | 2001-339458 | 12/2001 |
| JP | 2002-26735 | 1/2002 |
| WO | WO 02/45326 | 6/2002 |
| WO | WO 02/063818 | 8/2002 |

OTHER PUBLICATIONS

Wang et al.; Optimal blind transport format detection for UMTS uplink; Wireless Personal Multimedia Communications, 2002. The 5th International Symposium on; □□Oct. 27-30, 2002; vol.: 1; pp. 102-106 vol. 1.*

* cited by examiner

Primary Examiner—R. Stephen Dildine
(74) Attorney, Agent, or Firm—Young & Thompson

(57) ABSTRACT

A transport format determination apparatus and method determines, for each transport channel, transport formats to be used for supplying data every data-arrival-interval. A plurality of transport channels different in data-arrival-interval are free to be multiplexed with each other. A fault of data on the plurality of transport channels is detected. At least one first data-arrival-interval of at least one first transport channel is determined, based on a result of detecting fault of data on a second transport channel having a second data-arrival-interval shorter than the at least one first data-arrival-interval. A candidate of transport format combination indicators to be used for decoding post-received data and for isolating transfer blocks is restricted.

18 Claims, 5 Drawing Sheets

FIG. 3

| TFCI | TF | | |
|---|---|---|---|
| | TrCH#0 | TrCH#1 | TrCH#2 |
| 0 | 0 | 0 | 0 |
| 1 | 0 | 1 | 1 |
| 2 | 0 | 2 | 2 |
| 3 | 1 | 0 | 3 |
| 4 | 1 | 1 | 1 |
| 5 | 1 | 2 | 0 |

TF-DETERMINATION APPARATUS, AND TF-DETERMINATION METHOD AS WELL AS PROGRAM TO BE EXECUTED FOR IMPLEMENTING THE TF-DETERMINATION METHOD

BACKGROUND OF THE INVENTION

1. Field of the Invention

The present invention relates to a transport format determination apparatus (TF-determination apparatus) for determining a transport format (TF) in a wire-less transmission system, and a transport format determination method (TF-determination method) as well as a program to be executed for implementing the TF-determination method.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

There has been known a wire-less transmission system regulated by a third generation partnership project (3GPP). FIG. 1 is a timing chart illustrative of a plurality of transport channels (TrCH#0), (TrCH#1) and (TrCH#2) with different transmission time intervals (TTIs) from each other, which are multiplexed in the wire-less transmission system. The transport channel (TrCH#0) has a transmission time interval (TTI) of 40 ms. The transport channel (TrCH#1) has a minimum transmission time interval (TTI) of 20 ms. The transport channel (TrCH#2) has a transmission time interval (TTI) of 80 ms. If TrCH#1 (1,0) with the minimum transmission time interval (TTI) is decoded to confirm that a result of a cyclic redundancy check (CRC) is "OK" or "not fault", then it is presumed that a transport format combination indicator (TFCI) determination was correct, whereby other transport channels, for example, TrCH#0 (0,0) and TrCH#2 (2,0) can be defined.

If any transport channel (TrCH) with a defined transport format (TF) is present, for example "frame#2" and "frame#4", then the TFCI are allowed to take limited values, for which reason a decoding performance of the TFCI can be improved by using its information.

The transport channel (TrCH) is a channel provided from a physical layer to a media access control (MAC) sub-layer. There are plural kinds of the transport channel (TrCH) for transmitting plural kinds of data different in property and transmission format over the physical layer. The transmission time interval (TTI) is defined to be a time interval between arrivals of transport block sets between the layers. The transport block set is also defined to a set of transport blocks as basic units of concurrent transmissions between a layer 1 and the media access control (MAC) sub-layer through the same transport channel (TrCH). The transmission time interval (TTI) is equal to a time interval of transferring the transport block sets by the layer 1 over a wire-less interface. The media access control (MAC) provides data to the layer 1 every transmission time interval (TTI). The layer 1 provides the cyclic redundancy check (CRC) every transport block.

The transport format (TF) is a format for supplying transport blocks every transmission time interval (TTI) over the transport channel (TrCH). The transport format combination indicator (TFCI) has a one-to-one correspondence to a transport format combination (TFC), whereby the layer 1 generates it from the transport format combination (TFC) and transmits it over a wire-less interface. On a receiving side layer 1, the transport format combination indicator (TFCI) is used for decoding the received data and isolating the transport blocks. The layer 1 allows multiplexing a plurality of the transport channels (TrCH), for which reason there exist a combination of the transport channels (TrCH) which are concurrently transferable over the layer 1. This combination is defined to be the transport format combination (TFC).

In accordance with the above-described conventional wire-less transmission system, if the transport channels (TrCH) with different transmission time intervals (TTI) from each other are multiplexed, then this allows that a result of decoding the transport format combination indicator (TFCI) be fault due to a transmission noise. In this case, it is possible that there are different transport formats (TF) to (2,0) data of the transport channel (TrCH#2) between the frame #0 and the frame #2, wherein the frame corresponds to the transport block. Namely, it is possible that the different transport formats (TF) are presented to the same data.

In the above circumstances, the development of a novel technique of reducing a possibility that different transport formats (TF) are presented to the same data is desirable.

SUMMARY OF THE INVENTION

Accordingly, it is an object of the present invention to provide a novel transport format (TF) determination apparatus for determining a transport format (TF) in a wire-less transmission system, which is free from the above problems.

It is a further object of the present invention to provide a novel transport format (TF) determination apparatus for determining a transport format (TF), which is capable of reducing a possibility that different transport formats (TF) are presented to the same data, and improving a transport format (TF) determination performance.

It is a still further object of the present invention to provide a novel transport format (TF) determination method of determining a transport format (TF), which is free from the above problems.

It is yet a further object of the present invention to provide a novel transport format (TF) determination method of determining a transport format (TF), which is capable of reducing a possibility that different transport formats (TF) are presented to the same data, and improving a transport format (TF) determination performance.

It is further more object of the present invention to provide a novel program to be executed for implementing the transport format (TF) determination method of determining a transport format (TF), which is free from the above problems.

It is moreover object of the present invention to provide a novel program to be executed for implementing the transport format (TF) determination method of determining a transport format (TF), which is capable of reducing a possibility that different transport formats (TF) are presented to the same data, and improving a transport format (TF) determination performance.

A transport format determination apparatus and method determines, for each transport channel, transport formats to be used for supplying data every data-arrival-interval. A plurality of transport channels different in data-arrival-interval are free to be multiplexed with each other. A fault of data on the plurality of transport channels is detected. At least one first data-arrival-interval of at least one first transport channel is determined, based on a result of detecting fault of data on a second transport channel having a second data-arrivalinterval shorter than the at least one first data-arrival-interval. A candidate of transport format combination indicators to be used for decoding post-received data and for isolating transfer blocks is restricted. The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 3 is a view illustrative of typical examples of correspondences between transport format combination indicators (TFCI) and transport formats (TF).

DETAILED DESCRIPTION OF THE PREFERRED EMBODIMENTS

Figure 1:
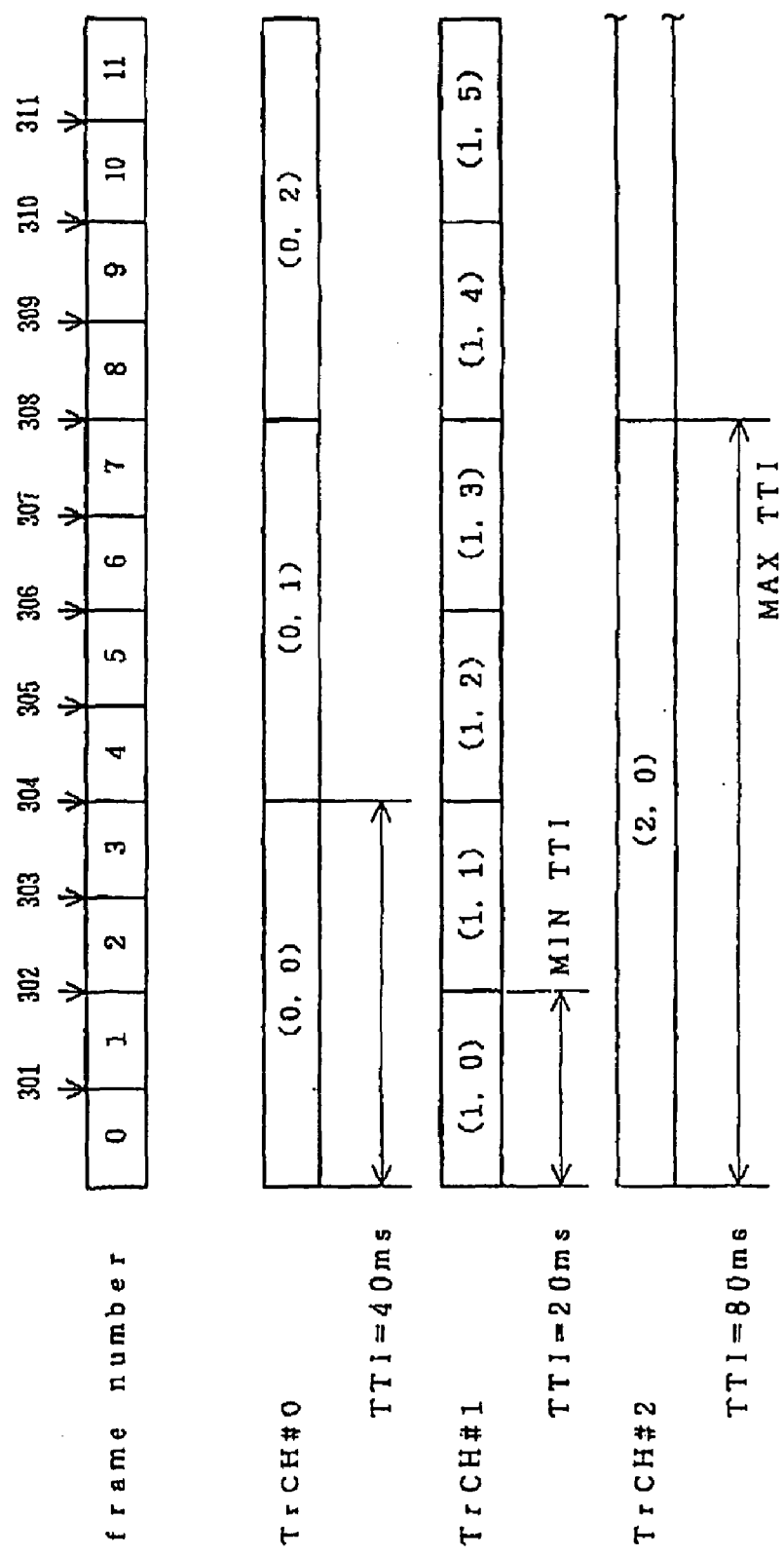
FIG. 1 is a timing chart illustrative of a plurality of transport channels with different transmission time intervals from each other, which are free to be multiplexed in the wire-less transmission system.

A first aspect of the present invention is a transport format determination apparatus determining, for each transport channel, transport formats to be used for supplying data every data-arrival-interval. A plurality of transport channels different in data-arrival-interval are free to be multiplexed with each other. The transport format determination apparatus includes: a detecting unit for detecting a fault of data on the plurality of transport channels; and a transport format combination indicator restricting unit for determining at least one first data-arrival-interval of at least one first transport channel, based on a result, from the detecting unit, of detecting fault of data on a second transport channel having a second data-arrival-interval shorter than the at least one first data-arrival-interval, and the transport format combination indicator restricting unit for restricting a candidate of transport format combination indicators to be used for decoding subsequently-received data and for isolating transfer blocks, if a plurality of the transport channels different in data-arrival-interval are multiplexed with each other. The second data-arrival-interval is the shortest interval. The result of detecting fault of data is a result of detecting a cyclic redundancy check of the second transport channel having the second data-arrival-interval which is the shortest interval. The above-described configuration reduces a possibility that different transport formats are presented for the same data, and also improves the performance of determining the transport format. The restriction of the transport format combination indicator may, for example, be so made as shown in FIGS. 1 and 3. At the initial boundary (302) of the transmission time intervals (TTI), all the transfer formats of the of all the transport channels (TrCH) are effective. At this boundary, the transport format combination indicator (TFCI) is decoded. Assuming that decoding result is "4", the transfer format of the transport channel (TrCH#1) is determined to be "1". Under this condition, the data decoding operation and the cyclic redundancy check (CRC) operation are made. If the cyclic redundancy check (CRC) is "OK", then the decoded value "4" of the transport format combination indicator (TFCI) is determined to be accurate, and the transfer formats of the remaining transfer channels "TrCH#0" (0,0) and "TrCH#2" (2,0) are determined to be "1", respectively.

When the transport format combination indicator (TFCI) is decoded at the next boundary (304) of the transmission time intervals (TTI), it has been recognized that the transfer formats of the remaining transfer channels "TrCH#0" (0,0) and "TrCH#2" (2,0) are determined to be "1", respectively. For this reason, it is possible to restrict the transport format combination indicator (TFCI) into "1" or "4".

It is possible that the transport format combination indicator restricting unit restricts the candidate of transport format combination indicators, based on the at least one first data-arrival-interval as determined.

It is also possible that the transport format combination indicator restricting unit determines a transport format of a transport channel which is currently free of a data-arrival-interval boundary, based on a current transport format combination indicator, and makes null other transport format than the determined transport format, if the detecting unit has not detected a fault of data on the plurality of transport channels.

It is also possible that the transport format combination indicator restricting unit makes effective each transport format of each transport channel which has a data-arrival-interval boundary.

It is also possible that the transport format determination apparatus further includes: a transport format combination indicator determination unit for removing, from the candidate, a transport format combination indicator including a null transport format and decoding other transport format combination indicator than the removed transport format combination indicator, when at least one of the transport channels becomes having a data-arrival-interval boundary.

It is also possible that the transport format determination apparatus further includes: a transport format combination indicator determination unit for removing, from the candidate, a transport format combination indicator including a null transport format and decoding other transport format combination indicator than the removed transport format combination indicator at a boundary of the transport blocks.

A second aspect of the present invention is a transport format determination method of determining, for each transport channel, transport formats to be used for supplying data every data-arrival-interval. A plurality of transport channels different in data-arrival-interval are free to be multiplexed with each other. The transport format determination method includes: detecting a fault of data on the plurality of transport channels; determining at least one first data-arrival-interval of at least one first transport channel, based on a result of detecting fault of data on a second transport channel having a second data-arrival-interval shorter than the at least one first data-arrival-interval, and restricting a candidate of transport format combination indicators to be used for decoding subsequently-received data and for isolating transfer blocks, if a plurality of the transport channels different in data-arrival-interval are multiplexed with each other. The second data-arrival-interval is the shortest interval. The result of detecting fault of data is a result of detecting a cyclic redundancy check of the second transport channel having the second data-arrival-interval which is the shortest interval. The above-described configuration reduces a possibility that different transport formats are presented for the same data, and also improves the performance of determining the transport format. The restriction of the transport format combination indicator may, for example, be so made as shown in FIGS. 1 and 3. At the initial boundary (302) of the transmission time intervals (TTI), all the transfer formats of the of all the transport channels (TrCH) are effective. At this boundary, the transport format combination indicator (TFCI) is decoded. Assuming that decoding result is "4", the transfer format of the transport channel (TrCH#1) is determined to be "1". Under this condition, the data decoding operation and the cyclic redundancy check (CRC) operation are made. If the cyclic redundancy check (CRC) is "OK", then the decoded value "4" of the transport format combination indicator (TFCI) is determined to be accurate, and the transfer formats of the remaining transfer channels "TrCH#0" (0,0) and "TrCH#2" (2,0) are determined to be "1", respectively.

When the transport format combination indicator (TFCI) is decoded at the next boundary (304) of the transmission time intervals (TTI), it has been recognized that the transfer formats of the remaining transfer channels "TrCH#0" (0,0) and "TrCH#2" (2,0) are determined to be "1", respectively. For this reason, it is possible to restrict the transport format combination indicator (TFCI) into "1" or "4".

It is possible that the candidate of transport format combination indicators is restricted based on the at least one first data-arrival-interval as determined.

It is also possible that a transport format of a transport channel, which is currently free of a data-arrival-interval boundary, is determined, based on a current transport format combination indicator, and other transport format than the determined transport format is made null, if no fault of data has been detected on the plurality of transport channels.

It is also possible that each transport format of each transport channel, which has a data-arrival-interval boundary, is made effective.

It is also possible that the transport format determination method further includes: removing, from the candidate, a transport format combination indicator including a null transport format, and decoding other transport format combination indicator than the removed transport format combination indicator, when at least one of the transport channels becomes having a data-arrival-interval boundary.

It is also possible that the transport format determination method further includes: removing, from the candidate, a transport format combination indicator including a null transport format and decoding other transport format combination indicator than the removed transport format combination indicator at a boundary of the transport blocks.

A third aspect of the present invention is a program to be executed for implementing a transport format determination method of determining, for each transport channel, transport formats to be used for supplying data every data-arrival-interval. A plurality of transport channels different in data-arrival-interval are free to be multiplexed with each other. The program includes: detecting a fault of data on the plurality of transport channels; and determining at least one first data-arrival-interval of at least one first transport channel, based on a result of detecting fault of data on a second transport channel having a second data-arrival-interval shorter than the at least one first data-arrival-interval, and restricting a candidate of transport format combination indicators to be used for decoding subsequently-received data and for isolating transfer blocks, if a plurality of the transport channels different in data-arrival-interval are multiplexed with each other. The second data-arrival-interval is the shortest interval. The result of detecting fault of data is a result of detecting a cyclic redundancy check of the second transport channel having the second data-arrival-interval which is the shortest interval. The above-described configuration reduces a possibility that different transport formats are presented for the same data, and also improves the performance of determining the transport format. The restriction of the transport format combination indicator may, for example, be so made as shown in FIGS. 1 and 3. At the initial boundary (302) of the transmission time intervals (TTI), all the transfer formats of the of all the transport channels (TrCH) are effective. At this boundary, the transport format combination indicator (TFCI) is decoded. Assuming that decoding result is "4", the transfer format of the transport channel (TrCH#1) is determined to be "1". Under this condition, the data decoding operation and the cyclic redundancy check (CRC) operation are made. If the cyclic redundancy check (CRC) is "OK", then the decoded value "4" of the transport format combination indicator (TFCI) is determined to be accurate, and the transfer formats of the remaining transfer channels "TrCH#0" (0,0) and "TrCH#2" (2,0) are determined to be "1", respectively.

When the transport format combination indicator (TFCI) is decoded at the next boundary (304) of the transmission time intervals (TTI), it has been recognized that the transfer formats of the remaining transfer channels "TrCH#0" (0,0) and "TrCH#2" (2,0) are determined to be "1", respectively. For this reason, it is possible to restrict the transport format combination indicator (TFCI) into "1" or "4".

It is possible that the candidate of transport format combination indicators is restricted based on the at least one first data-arrival-interval as determined.

It is also possible that a transport format of a transport channel, which is currently free of a data-arrival-interval boundary, is determined, based on a current transport format combination indicator, and other transport format than the determined transport format is made null, if no fault of data has been detected on the plurality of transport channels.

It is also possible that each transport format of each transport channel, which has a data-arrival-interval boundary, is made effective.

It is possible that the program further includes: removing, from the candidate, a transport format combination indicator including a null transport format, and decoding other transport format combination indicator than the removed transport format combination indicator, when at least one of the transport channels becomes having a data-arrival-interval boundary.

It is possible that the program further includes: removing, from the candidate, a transport format combination indicator including a null transport format and decoding other transport format combination indicator than the removed transport format combination indicator at a boundary of the transport blocks.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

Figure 2:
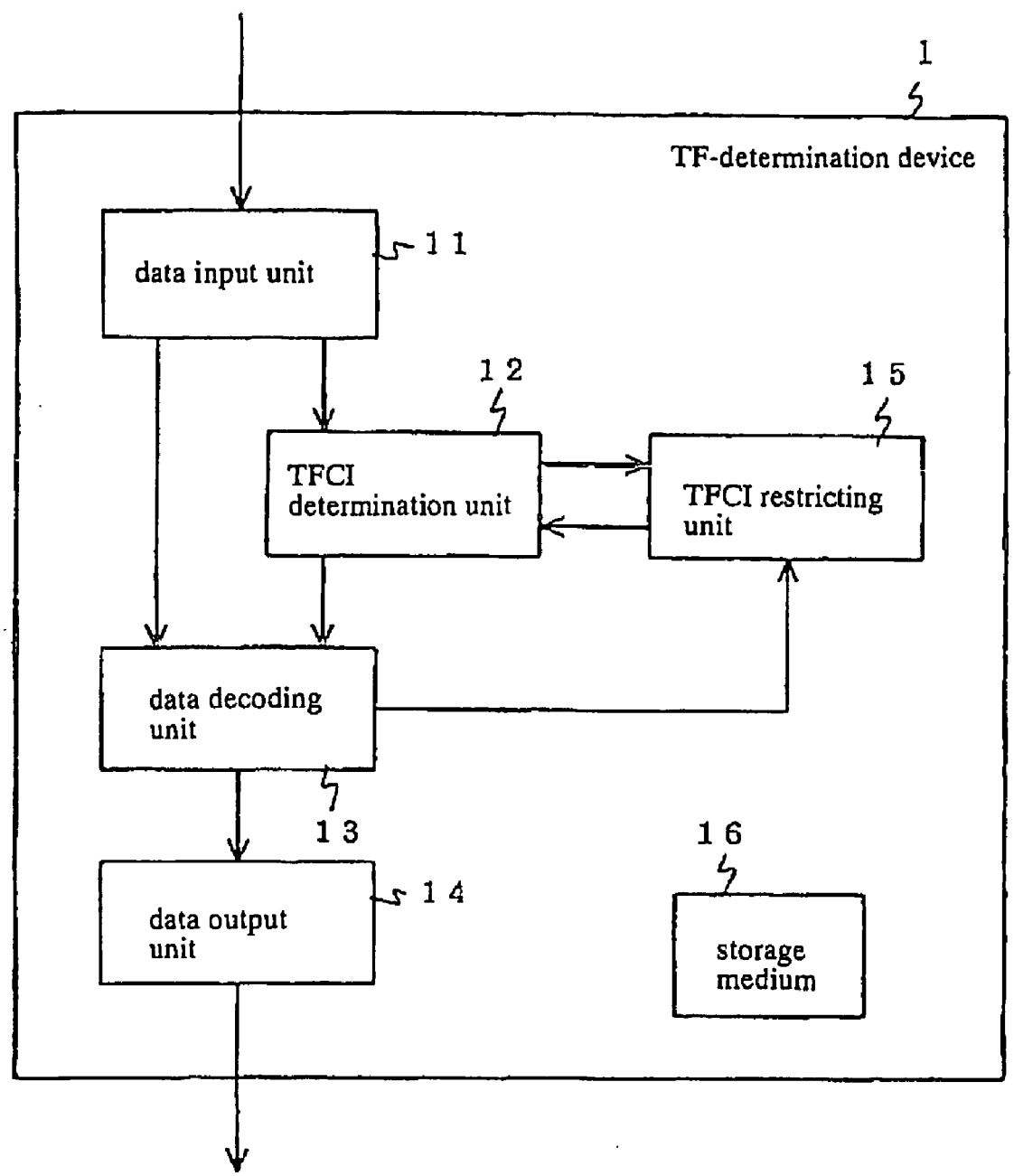
FIG. 2 is a block diagram illustrative of a configuration of a transport format determination apparatus (TF-determination apparatus) in a first embodiment in accordance with the present invention.

First Embodiment:

A first embodiment according to the present invention will be described in detail with reference to the drawings. FIG. 2 is a block diagram illustrative of a configuration of a transport format determination apparatus (TF-determination apparatus) 1 in a first embodiment in accordance with the present invention.

The TF-determination apparatus 1 includes a data input unit 11, a transport format combination indicator (TFCI) determination unit 12, a data decoding unit 13, a data output unit 14, a transport format combination indicator (TFCI) restricting unit 15, and a storage medium 16.

The data input unit 11 is a unit for allowing inputs of data. The transport format combination indicator (TFCI) determination unit 12 is a unit for separating a transport format combination indicator (TFCI) information from the received input data, and for decoding the transport format combination indicator (TFCI) information in order to determine a transport format (TF).

The data decoding unit 13 decodes the input data, based on the transport format (TF) information from the transport format combination indicator (TFCI) determination unit 12, so that the data decoding unit 13 determines a cyclic redundancy check (CRC). The data output unit 14 is a unit for outputting the decoded data. The transport format combination indicator (TFCI) restricting unit 15 prepares a restriction information for restricting the transport format combination indicator (TFCI), based on the determined cyclic redundancy check (CRC) from the data decoding unit 13 and the transport format combination indicator (TFCI) information from the transport format combination indicator (TFCI) determination unit 12. The storage medium 16 stores a program to be executed by a computer for realizing the above-described respective processes.

The transport channel (TrCH) is a channel supplied from a physical layer to a media access control (MAC) sub-layer. There are plural kinds of the transport channel (TrCH) for transmitting data different in properties and transfer formats over the physical layer.

The transmission time interval (TTI) is defined to be a time interval between arrivals of transport block sets between the layers. The transport block set is also defined to a set of transport blocks as basic units of concurrent transmissions between a layer 1 and the media access control (MAC) sub-layer through the same transport channel (TrCH). The transmission time interval (TTI) is equal to a time interval of transferring the transport block sets by the layer 1 over a wire-less interface. The media access control (MAC) provides data to the layer 1 every transmission time interval (TTI). The layer 1 provides the cyclic redundancy check (CRC) every transport block.

The transport format (TF) is a format for supplying transport blocks every transmission time interval (TTI) over the transport channel (TrCH). The transport format combination indicator (TFCI) has a one-to-one correspondence to a transport format combination (TFC), whereby the layer 1 generates it from the transport format combination (TFC) and transmits it over a wire-less interface.

On a receiving side layer 1, the transport format combination indicator (TFCI) is used for decoding the received data and isolating the transport blocks. The layer 1 allows multiplexing a plurality of the transport channels (TrCH), for which reason there exist a combination of the transport channels (TrCH) which are concurrently transferable over the layer 1. This combination is defined to be the transport format combination (TFC).

Figure 4:
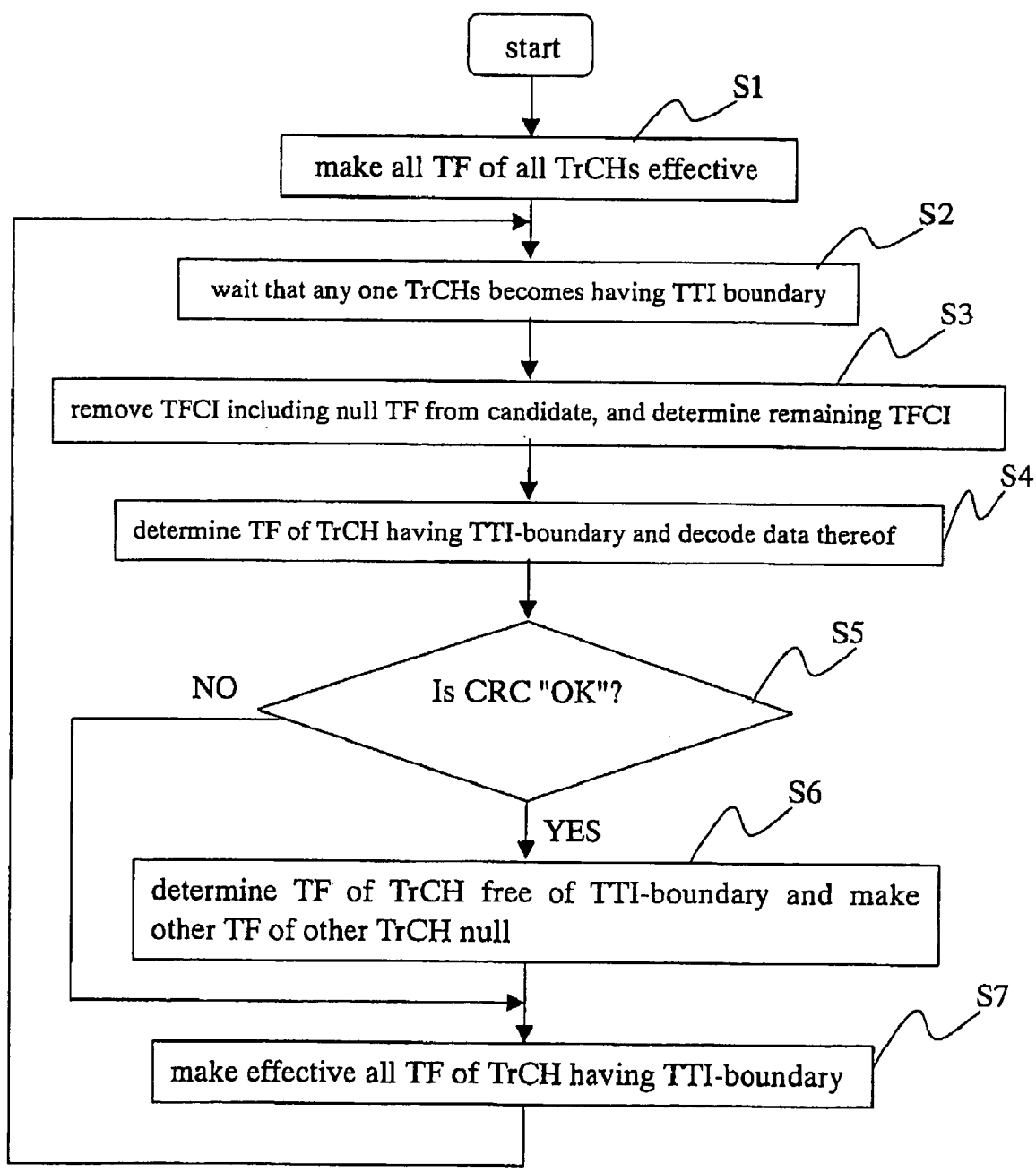
FIG. 4 is a flow chart illustrative of operations of the TF-determination apparatus 1 shown in FIG. 2.

As described above, FIG. 1 illustrates one typical example of the timing chart of the multiplexed transport channels (TrCH) different in transmission time interval (TTI). FIG. 3 is a view illustrative of typical examples of correspondences between transport format combination indicators (TFCI) and transport formats (TF). FIG. 4 is a flow chart illustrative of operations of the TF-determination apparatus 1 shown in FIG. 2. Operations of the TF-determination apparatus 1 will be described with reference to FIGS. 1–4. The sequential processes shown in FIG. 4 will be realized by execution of a program by a computer, wherein the program was stored in the storage medium 16.

As shown in FIG. 3, if the transport format combination indicator (TFCI) is "0", then the transport format (TF) of the transport channel (TrCH#0) is "0", the transport format (TF) of the transport channel (TrCH#1) is "0", and the transport format (TF) of the transport channel (TrCH#2) is "0".

If the transport format combination indicator (TFCI) is "1", then the transport format (TF) of the transport channel (TrCH#0) is "0", the transport format (TF) of the transport channel (TrCH#1) is "1", and the transport format (TF) of the transport channel (TrCH#2) is "1".

If the transport format combination indicator (TFCI) is "2", then the transport format (TF) of the transport channel (TrCH#0) is "0", the transport format (TF) of the transport channel (TrCH#1) is "2", and the transport format (TF) of the transport channel (TrCH#2) is "2".

If the transport format combination indicator (TFCI) is "3", then the transport format (TF) of the transport channel (TrCH#0) is "1", the transport format (TF) of the transport channel (TrCH#1) is "0", and the transport format (TF) of the transport channel (TrCH#2) is "3".

If the transport format combination indicator (TFCI) is "4", then the transport format (TF) of the transport channel (TrCH#0) is "1", the transport format (TF) of the transport channel (TrCH#1) is "1", and the transport format (TF) of the transport channel (TrCH#2) is "1".

If the transport format combination indicator (TFCI) is "5", then the transport format (TF) of the transport channel (TrCH#0) is "1", the transport format (TF) of the transport channel (TrCH#1) is "2", and the transport format (TF) of the transport channel (TrCH#2) is "0".

With reference to FIG. 4, the operations of the TF-determination apparatus 1 will be described.

In step S1, upon connection, the transport format combination indicator (TFCI) restricting unit 15 makes all the transport formats (TF) of all the transport channels (TrCH) effective.

In step S2, it is verified that any one of the transport channels (TrCH) becomes having a boundary of the transmission time intervals (TTI), for example, "302" for the transport channel (TrCH#1), "304" for the transport channels (TrCH#0) and (TrCH#1) and "306" for the transport channel (TrCH#1).

In step S3, the transport format combination indicator (TFCI) determination unit 12 removes the transport format combination indicator (TFCI) including any null transport format (TF) from a candidate, and further determines the remaining transport format combination indicators (TFCI).

In step S4, the data decoding unit 13 determines a transport format (TF) of a transport channel (TrCH) which becomes having the boundary of the transmission time intervals (TTI), based on a result of decoding the remaining transport format combination indicators (TFCI), and then the data decoding unit 13 decodes data of the determined transport channel (TrCH) having the boundary.

In step S5, the transport format combination indicator (TFCI) restricting unit 15 determines a cyclic redundancy check (CRC), based on a result of decoding the data from the data decoding unit 13. Namely, the transport format combination indicator (TFCI) restricting unit 15 verifies whether or not the cyclic redundancy check (CRC) is "OK" or "fault".

In step S6, if the cyclic redundancy check (CRC) is "OK", then the transport format combination indicator (TFCI) restricting unit 15 determines the transport format (TF) of the transport channel (TrCH) currently free of the boundary of the transmission time intervals (TTI), for example, at a timing "302", the transport channel (TrCH#1) and the transport channel (TrCH#2), based on the current transport format combination indicator (TFCI). Namely, the transport format combination indicator (TFCI) restricting unit 15 makes effective the transport format (TF) of the transport channel (TrCH) currently free of the boundary of the transmission time intervals (TTI), and also makes null the transport format (TF) of the remaining transport channel (TrCH).

If the cyclic redundancy check (CRC) is "fault", then the above-described processes of step S6 are not executed.

In step S7, the transport format combination indicator (TFCI) restricting unit 15 makes effective all of the transport formats (TF) of the transport channels (TrCH) having the boundary of the transmission time intervals (TTI), for waiting for the next boundary of the transmission time intervals (TTI) in step S2, wherein the transport channel (TrCH) having the boundary of the transmission time intervals (TTI) will take other transport format (TF) at the next frame which corresponds to the transport block.

In accordance with the present embodiment, the transport format combination indicator (TFCI) restricting unit 15 determines the cyclic redundancy check (CRC), based on the result of decoding the data from the data decoding unit 13. If the cyclic redundancy check (CRC) is "OK", then the transport format combination indicator (TFCI) restricting unit 15 determines the transport format (TF) of the transport channel (TrCH) currently free of the boundary of the transmission time intervals (TTI), based on the current transport format combination indicator (TFCI), and also makes null the transport format (TF) of the remaining transport channel (TrCH). The transport format combination indicator (TFCI) restricting unit 15 makes effective all of the transport formats (TF) of the transport channels (TrCH) having the boundary of the transmission time intervals (TTI), thereby improving an accuracy of determination of the transport formats (TF) of the transport channels (TrCH) having the short transmission time intervals (TTI).

Accordingly, the transport format (TF) determination apparatus determines, for each transport channel, transport formats to be used for supplying data every data-arrival-interval, wherein a plurality of the transport channels different in data-arrival-interval are free to be multiplexed with each other. If the plurality of the transport channels different in data-arrival-interval are multiplexed with each other, then other data-arrival-interval of other transport channel is determined based on a result of detecting fault of data on a transport channel with a shortest data-arrival-interval for the purpose of restricting transport format combination indicators to be used for decoding subsequently-received data and isolating transfer blocks, thereby reducing a possibility that different transport formats are presented for the same data, and also improving the performance of determining the transport format.

Figure 5:
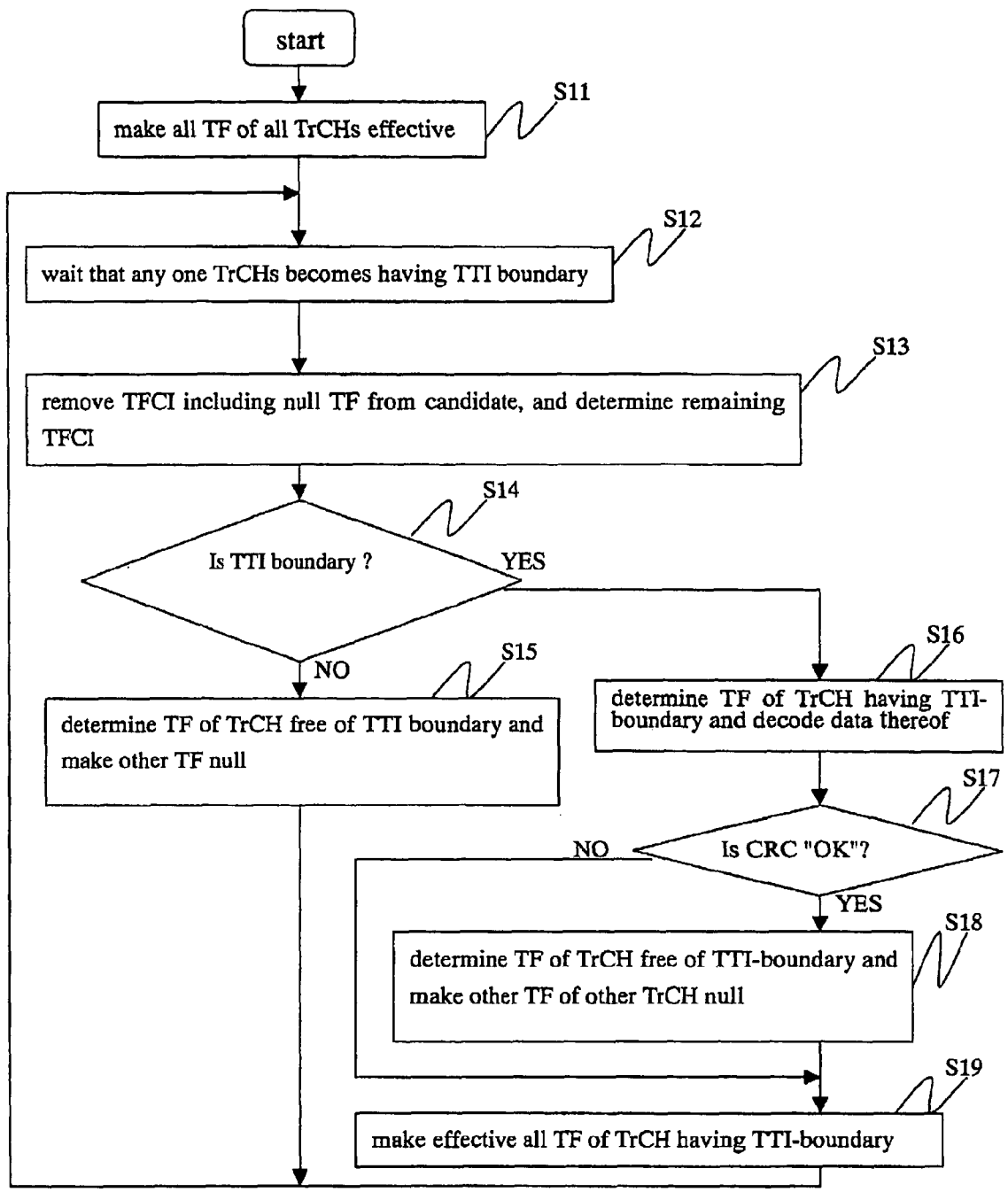
FIG. 5 is a flow chart illustrative of operations of the TF-determination apparatus 1 in the second embodiment in accordance with the present invention.

Second Embodiment:

A second embodiment according to the present invention will be described in detail with reference to the drawings. A transport format determination apparatus (TF-determination apparatus) 1 has the same configuration as shown in FIG. 2. Any duplicate descriptions of the same configuration of the transport format determination apparatus (TF-determination apparatus) 1 will be omitted. A substantive difference of this second embodiment from the above-described first embodiment is on the sequential operations of the TF-determination apparatus 1. Accordingly, the following descriptions will focus on the operations of the TF-determination apparatus 1 in accordance with the second embodiment of the present invention. The signals which are subject to the TF-determination are as shown in FIG. 1. FIG. 5 is a flow chart illustrative of operations of the TF-determination apparatus 1 in the second embodiment in accordance with the present invention.

With reference to FIG. 5, the operations of the TF-determination apparatus 1 will be described.

In step S11, upon connection, the transport format combination indicator (TFCI) restricting unit 15 makes all the transport formats (TF) of all the transport channels (TrCH) effective.

In step S12, it is verified that any one of the transport channels (TrCH) becomes having a boundary of the frames, for example, "301", "302", "303", and "304".

In step S13, the transport format combination indicator (TFCI) determination unit 12 removes the transport format combination indicator (TFCI) including any null transport format (TF) from a candidate at the frame boundary, and further determines the remaining transport format combination indicators (TFCI).

In step S14, it is verified that any one of the transport channels (TrCH) becomes having a boundary of the transmission time intervals (TTI), for example, "302" for the transport channel (TrCH#1), "304" for the transport channels (TrCH#0) and (TrCH#1) and "306" for the transport channel (TrCH#1).

In step S15, if any one of the transport channels (TrCH) is currently free of the boundary of the transmission time intervals (TTI), then the transport format combination indicator (TFCI) restricting unit 15 determines the transport format (TF) of the transport channel (TrCH) currently free of the boundary of the transmission time intervals (TTI), for example, at a timing "301", the transport channel (TrCH#1) and the transport channel (TrCH#2), based on the current transport format combination indicator (TFCI). Namely, the transport format combination indicator (TFCI) restricting unit 15 makes effective the transport format (TF) of the transport channel (TrCH) currently free of the boundary of the transmission time intervals (TTI), and also makes null the transport format (TF) of the remaining transport channel (TrCH), and waits for the next frame boundary in step S12.

In step S16, if any one of the transport channels (TrCH) becomes having the boundary of the transmission time intervals (TTI), then the data decoding unit 13 determines a transport format (TF) of a transport channel (TrCH) which becomes having the boundary of the transmission time intervals (TTI), based on a result of decoding the remaining transport format combination indicators (TFCI), and then the data decoding unit 13 decodes data of the determined transport channel (TrCH) having the boundary.

In step S17, the transport format combination indicator (TFCI) restricting unit 15 determines a cyclic redundancy check (CRC), based on a result of decoding the data from the data decoding unit 13. Namely, the transport format combination indicator (TFCI) restricting unit 15 verifies whether or not the cyclic redundancy check (CRC) is "OK" or "fault".

In step S18, if the cyclic redundancy check (CRC) is "OK", then the transport format combination indicator (TFCI) restricting unit 15 determines the transport format (TF) of the transport channel (TrCH) currently free of the boundary of the transmission time intervals (TTI), for example, at a timing "302", the transport channel (TrCH#1) and the transport channel (TrCH#2), based on the current transport format combination indicator (TFCI). Namely, the transport format combination indicator (TFCI) restricting unit 15 makes effective the transport format (TF) of the transport channel (TrCH) currently free of the boundary of the transmission time intervals (TTI), and also makes null the transport format (TF) of the remaining transport channel (TrCH).

If the cyclic redundancy check (CRC) is "fault", then the above-described processes of step S18 are not executed.

In step S19, the transport format combination indicator (TFCI) restricting unit 15 makes effective all of the transport formats (TF) of the transport channels (TrCH) having the boundary of the transmission time intervals (TTI), for waiting for the next boundary of the transmission time intervals (TTI) in step S2, wherein the transport channel (TrCH) having the boundary of the transmission time intervals (TTI) will take other transport format (TF) at the next frame which corresponds to the transport block.

The transport format combination indicator (TFCI) restricting unit 15 determines the transport format (TF) of the transport channel (TrCH) currently free of the boundary of the transmission time intervals (TTI), based on the current transport format combination indicator (TFCI), and also makes null the transport format (TF) of the remaining transport channel (TrCH). The transport format combination indicator (TFCI) restricting unit 15 makes effective all of the transport formats (TF) of the transport channels (TrCH) having the boundary of the transmission time intervals (TTI), thereby improving an accuracy of determination of the transport formats (TF) of the transport channels (TrCH) having the short transmission time intervals (TTI). This configuration of the second embodiment allows separation of the transport channels (TrCH) in the frame units if the method of multiplexing the transport channels (TrCH) is flexible position.

Accordingly, the transport format (TF) determination apparatus determines, for each transport channel, transport formats to be used for supplying data every data-arrival-interval, wherein a plurality of the transport channels different in data-arrival-interval are free to be multiplexed with each other. If the plurality of the transport channels different in data-arrival-interval are multiplexed with each other, then other data-arrival-interval of other transport channel is determined based on a result of detecting fault of data on a transport channel with a shortest data-arrival-interval for the purpose of restricting transport format combination indicators to be used for decoding subsequently-received data and isolating transfer blocks, thereby reducing a possibility that different transport formats are presented for the same data, and also improving the performance of determining the transport format.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A transport format determination apparatus determining, for each transport channel, transport formats to be used for supplying data every data-arrival-interval, wherein a plurality of transport channels different in data-arrival-interval are free to be multiplexed with each other, and said transport format determination apparatus including:
   a detecting unit for detecting a fault of data on said plurality of transport channels; and
   a transport format combination indicator restricting unit for determining at least one first data-arrival-interval of at least one first transport channel, based on a result, from said detecting unit, of detecting fault of data on a second transport channel having a second data-arrival-interval shorter than said at least one first data-arrival-interval, and said transport format combination indicator restricting unit for restricting a candidate of transport format combination indicators to be used for decoding subsequently-received data and for isolating transfer blocks, if a plurality of said transport channels different in data-arrival-interval are multiplexed with each other.

2. The transport format determination apparatus as claimed in claim 1, wherein said transport format combination indicator restricting unit restricts said candidate of transport format combination indicators, based on said at least one first data-arrival-interval as determined.

3. The transport format determination apparatus as claimed in claim 1, wherein said transport format combination indicator restricting unit determines a transport format of a transport channel which is currently free of a data-arrival-interval boundary, based on a current transport format combination indicator, and, makes null other transport format than said determined transport format, if said detecting unit has not detected a fault of data on said plurality of transport channels.

4. The transport format determination apparatus as claimed in claim 1, wherein said transport format combination indicator restricting unit makes effective each transport format of each transport channel which has a data-arrival-interval boundary.

5. The transport format determination apparatus as claimed in claim 1, further including:
   a transport format combination indicator determination unit for removing, from said candidate, a transport format combination indicator including a null transport format and decoding other transport format combination indicator than said removed transport format combination indicator, when at least one of said transport channels becomes having a data-arrival-interval boundary.

6. The transport format determination apparatus as claimed in claim 1, further including:
   a transport format combination indicator determination unit for removing, from said candidate, a transport format combination indicator, including a null transport format and decoding other transport format combination indicator than said removed transport format combination indicator at a boundary of said transport blocks.

7. A transport format determination method of determining, for each transport channel, transport formats to be used for supplying data every data-arrival-interval, wherein a plurality of transport channels different in data-arrival-interval are free to be multiplexed with each other, and said transport format determination method including:

detecting a fault of data on said plurality of transport channels; and determining at least one first data-arrival-interval of at least one first transport channel, based on a result of detecting fault of data on a second transport channel having a second data-arrival-interval shorter than said at least one first data-arrival-interval, and restricting a candidate of transport format combination indicators to be used for decoding subsequently-received data and for isolating transfer blocks, if a plurality of said transport channels different in data-arrival-interval are multiplexed with each other.

8. The transport format determination method as claimed in claim 7, wherein said candidate of transport format combination indicators is restricted based on said at least one first data-arrival-interval as determined.

9. The transport format determination method as claimed in claim 7, wherein a transport format of a transport channel, which is currently free of a data-arrival-interval boundary, is determined, based on a current transport format combination indicator, and other transport format than said determined transport format is made null, if no fault of data has been detected on said plurality of transport channels.

10. The transport format determination method as claimed in claim 7, wherein each transport format of each transport channel, which has a data-arrival-interval boundary, is made effective.

11. The transport format determination method as claimed in claim 7, further including:

removing, from said candidate, a transport format combination indicator including a null transport format, and decoding other transport format combination indicator than said removed transport format combination indicator, when at least one of said transport channels becomes having a data-arrival-interval boundary.

12. The transport format determination method as claimed in claim 7, further including:

removing, from said candidate, a transport format combination indicator including a null transport format and decoding other transport format combination indicator than said removed transport format combination indicator at a boundary of said transport blocks.

13. A program storage medium readable by a computer, tangibly embodying a program of instructions executable by the computer to control the computer to function for implementing a transport format determination method, comprising the steps of:

determining, for each transport channel, transport formats to be used for supplying data every data-arrival-interval, wherein a plurality of transport channels different in data-arrival-interval are free to be multiplexed with each other;

detecting a fault of data on said plurality of transport channels; and determining at least one first data-arrival-interval of at least one first transport channel, based on a result of detecting fault of data on a second transport channel having a second data-arrival-interval shorter than said at least one first data-arrival-interval, and restricting a candidate of transport format combination indicators to be used for decoding subsequently-received data and for isolating transfer blocks, if a plurality of said transport channels different in data-arrival-interval are multiplexed with each other.

14. The program storage medium as claimed in claim 13, wherein said candidate of transport format combination indicators is restricted based on said at least one first data-arrival-interval as determined.

15. The program storage medium as claimed in claim 13, wherein a transport format of a transport channel, which is currently free of a data-arrival-interval boundary, is determined, based on a current transport format combination indicator, and other transport format than said determined transport format is made null, if no fault of data has been detected on said plurality of transport channels.

16. The program storage medium as claimed in claim 13, wherein each transport format of each transport channel, which has a data-arrival-interval boundary, is made effective.

17. The program storage medium as claimed in claim 13, further including instructions executable by the computer to control the computer to function for:

removing, from said candidate, a transport format combination indicator including a null transport format, and decoding other transport format combination indicator than said removed transport format combination indicator, when at least one of said transport channels becomes having a data-arrival-interval boundary.

18. The program storage medium as claimed in claim 13, further including instructions executable by the computer to control the computer to function for:

removing, from said candidate, a transport format combination indicator including a null transport format and decoding other transport format combination indicator than said removed transport format combination indicator at a boundary of said transport blocks.

* * * * *